UNITED STATES PATENT OFFICE 2,417,006

PROCESS FOR THE MANUFACTURE OF ACYL-SULFONAMIDES

Henry Martin, Franz Häfliger, and Otto Neracher, Basel, Switzerland, assignors to J. R. Geigy A. G., Basel, Switzerland, a Swiss firm No Drawing. Application May 1, 1944, Serial No. 533,659. In Switzerland May 21, 1943

6 Claims. (Cl. 260—397.7)

As known, aromatic acyl sulfonamides are produced by acylation of aromatic sulfonamides by means of acylating agents, like acid halides, acid anhydrides, etc., in the presence of condensation agents or acid binding agents. While the method with usual acylating agents gives satisfying yields, this is not the case, when functional derivatives of high molecular carboxylic acids are used. Moreover, valuable carboxylic acids are often accessible only with difficulty. A further disadvantage consists in that, for the purpose of acylation, valuable acid derivatives, like halides, anhydrides, etc., must be used which often are only obtainable with difficulty. Moreover, the catalysts or acid binding agents, like aluminium chloride, dry pyridine and the like, which are indispensable for the condensation, are often chemically and qualitatively changed during the interactions so that they can no more or only with considerable costs be regenerated.

In contradistinction thereto we have now found that compounds of the general formula $$R_1-C=N-SO_2-R_2$$
$$\quad\ |$$
$$\quad R_3$$

wherein $R_1$ means an aliphatic, araliphatic, aromatic, cycloaliphatic or heterocyclic radical, $R_2$ means an aromatic radical which is substituted by an amino group, and $R_3$ represents a radical bound by means of a hetero atom, can easily be converted by means of hydrolysing agents into the corresponding acyl sulfonamides of the formula $$R_1-CO-NH.SO_2.R_2$$

As starting materials for use in accordance with the invention sulfonylated amidines or imino ethers respectively may be employed, these products being accessible according to usual methods, for example by causing imino ethers to react with sulfonamides or according to U. S. Letters Patent No. 2,337,909, granted December 28, 1943. As hydrolysing agents, there may be used for instance: dilute aqueous or alcoholic mineral acids, especially hydrochloric acid.

It is surprising that aromatic acyl sulfonamides can be produced according to the above mentioned hydrolysis method, as it could not be gathered from the prior art that the splitting of the sulfonylated amidines or imino ethers respectively would take place in this manner and could be carried out practically uniformly. Furthermore, the new method presents the advantage that the starting compounds obtainable by interaction of the corresponding amidines or imino ethers with aromatic sulfohalides can in certain cases be obtained in an easier manner than the starting materials required for the methods known heretofore. Thus during the synthesis of carboxylic acids their nitriles are often obtained as intermediate products. These latter compounds can be converted directly and in a smooth manner into the corresponding amidines and imino ethers and then be caused to react with aromatc sulfohalides. Thus it is not necessary to pass through the stages of the carboxylic acid and its halides, as was the case when working according to the known methods. Besides, the sulfohalides can be used as second reaction partner without the necessity of first converting the same into sulfonamides. Moreover, many nitriles can only be saponified with difficulty, while they easily produce the corresponding amidines or imino ethers respectively.

The invention may now be illustrated, but not limited by the following examples, the parts being by weight.

Example 1

10 parts of N-(4-aminobenzene sulfone)-isovaleryl amidine (M. P. 118°–120° C.)

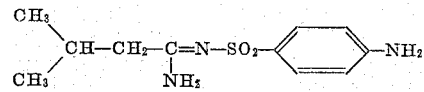

are heated for 2 hours to 90°–100° C. with 100 parts of 3.5% hydrochloric acid; after cooling the mixture is made alkaline with sodium carbonate, filtered and acidified by means of acetic acid. When recrystallised from dilute methyl alcohol, the 4-aminobenzene-N₁-isovaleroyl sulfamide is obtained, this product melting at 130° C. and having the following formula

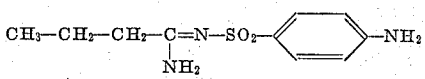

In the same manner for instance (a) N-(4-aminobenzene sulfone)-butyryl amidine

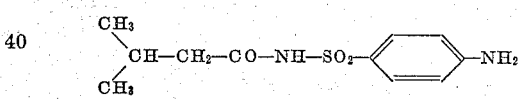

M. P. 70°–72° C. or (b) N-(4-aminobenzene sulfone)-isobutyryl amidine

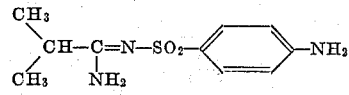

or (c) N-(4-aminobenzene sulfone)-β:β-dimethyl acryl amidine

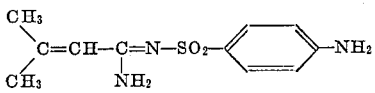

M. P. 128°–129° C. or (d) N-(4-aminobenzene sulfone)-α:β:β-trimethyl acryl amidine

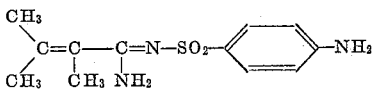

may also be hydrolysed to the corresponding acylated sulfonamides, namely: (a) 4-aminobenzene-$N_1$-butyroyl sulfamide

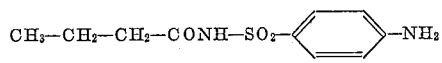

M. P. 126° C.   (b) 4-aminobenzene-$N_1$-isobutyroyl sulfamide

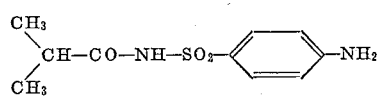

M. P. 199° C.   (c) 4-aminobenzene-$N_1$-(β:β-dimethyl acroyl)-sulfamide

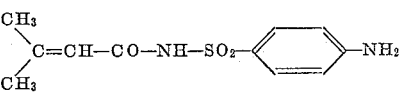

M. P. 184°–185° C.   (d) 4-aminobenzene-$N_1$-(α:β:β-trimetyl acroyl)-sulfamide

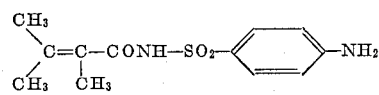

M. P. 181°–182° C.

Example 2

10 parts of N-(4-aminobenzene sulfone)-4'-methyl benzamidine

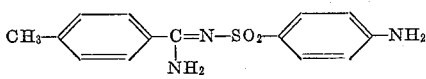

M. P. 236° C. are heated for 3 hours to 90°–100° C. with 100 parts of 3.5% hydrochloric acid. Then the mixture is made alkaline in the cold by means of a sodium carbonate solution, filtered and acidified with acetic acid. When recrystallising from alcohol, the 4-aminobenzene-$N_1$-(4'-methylbenzoyl)-sulfamide is obtained, the same melting at 178°–179° C. and having the following formula

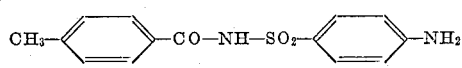

In the same manner may be obtained from (a) N-(4-aminobenzene sulfone)-4'-ethyl benzamidine

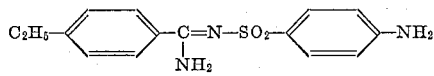

or (b) N-(4-aminobenzene sulfone)-4'-propyl benzamidine

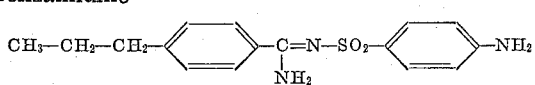

or (c) N-(4-aminobenzene sulfone)-4'-thioethyl ether benzamidine

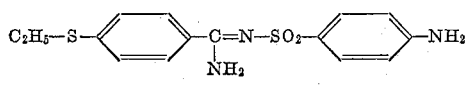

the corresponding acylated sulfonamides, namely:
(a) 4-aminobenzene-$N_1$-(4'-ethylbenzoyl)-sulfamide

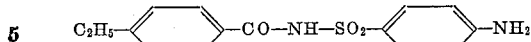

M. P. 162°–163° C.   (b) 4-aminobenzene-$N_1$-(4'-n-propyl benzoyl)-sulfamide

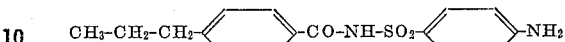

M. P. 162° C.   (c) 4-aminobenzene-$N_1$-(4'-thioethyl ether benzoyl)-sulfamide

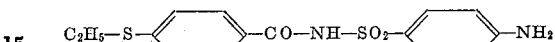

M. P. 185° C.

Example 3

10 parts of N-(4-aminobenzene sulfone)-3':4'-dimethyl benzamidine (M. P. 218°–220° C.) of the formula

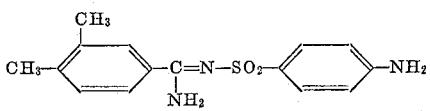

are stirred for 12 hours at 90°–100° C. in 100 parts of 3.5% hydrochloric acid. After cooling the mixture is made alkaline with sodium carbonate and worked up as indicated in Example 2. Thus the 4-aminobenzene-$N_1$-(3':4'-dimethylbenzoyl)-sulfamide of the melting point of 222° C. and of the formula

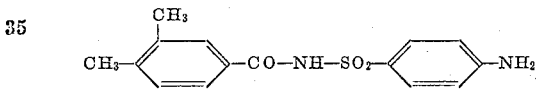

is obtained in a good yield.

In an analogous manner for instance (a) N-(4-aminobenzene sulfone)-3'-n-propyl-4'-methoxy benzamidine

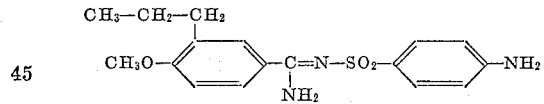

(b) N-(4-aminobenzene sulfone)-3'-allyl-4'-methoxy-benzamidine

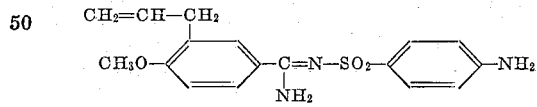

(c) N-(4-aminobenzene sulfone)-$\Delta_1$-cyclopentenoyl amidine

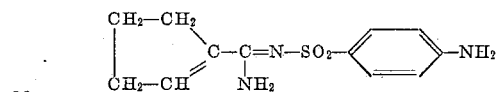

and (d) N-(4-aminobenzene sulfone)-$\Delta_1$-cyclohexenyl acetamidine

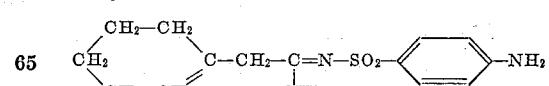

may also be hydrolysed in order to give the corresponding acylated sulfonamides, i. e., (a) 4-aminobenzene-$N_1$-(3'-n-propyl-4'-methoxybenzoyl)-sulfamide

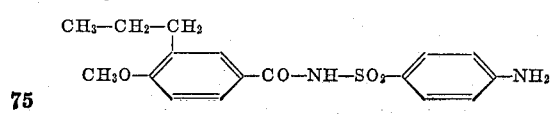

M. P. 213° C. (b) 4-aminobenzene-N₁-(3'-allyl-4'-methoxybenzoyl)-sulfamide

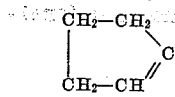

M. P. 202°–203° C. (c) 4-aminobenzene-N₁-(Δ1-cyclopentenoyl)-sulfamide

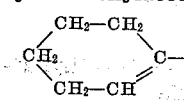

M. P. 202° C. and (d) 4-aminobenzene-N₁-(Δ1-cyclohexenylacetyl)-sulfamide

M. P. 176°–177° C.

Example 4

10 parts of N-(4-aminobenzene sulfone)-N'-diethyl-3':4'-dimethyl benzamidine (M. P. 148°–150° C.) of the formula

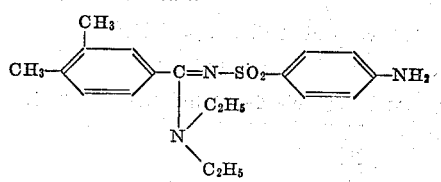

are heated while stirring for 24 hours to 90°–100° C. in 100 parts of 3.5% hydrochloric acid and worked up in the manner described in Example 2. Thus one obtains the 4-aminobenzene-N₁-(3':4'-dimethylbenzoyl)-sulfamide melting at 222° C. and having the formula

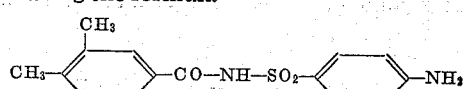

The same final product is also obtained by hydrolysing in accordance with the above example N-(4-aminobenzene sulfone)-N'-phenyl-3':4'-dimethyl benzamidine (M. P. 198°–200° C.) of the formula

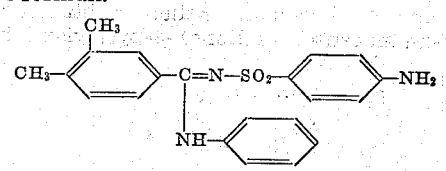

or the N'-dimethyl or N'-tolyl derivative.

Example 5

10 parts of N-(4-aminobenzene sulfone)-3':4'-dimethyl benzimino ethyl(or methyl)ether (M. P. 328°–329° C. under decomposition) of the formula

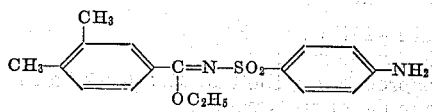

are hydrolyzed with stirring for 12 hours at 90°–100° C. with 100 parts of 3.5% hydrochloric acid and the mixture is worked up according to Example 2. Thus 4-aminobenzene-N₁-(3':4'-dimethylbenzoyl)-sulfamide is obtained in a good yield, this product having the following formula

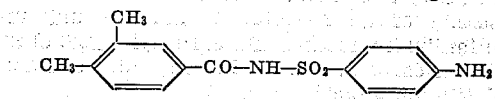

In an analogous manner (a) N-(4-aminobenzene sulfone)-4'-methyl benzimino ethyl ether.

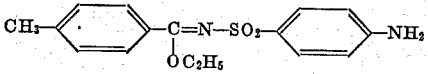

and (b) N-(4-aminobenzene sulfone)-4'-ethyl mercapto benzimino ethyl ether

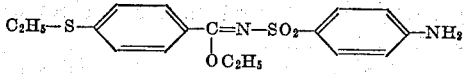

may be hydrolysed to give the corresponding acylated sulfonamides, namely: (a) 4-aminobenzene-N₁-(4'-methylbenzoyl)-sulfamide

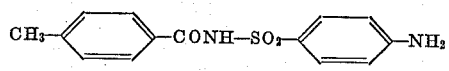

M. P. 178°–179° C. and (b) 4-aminobenzene-N₁-(4'-ethyl mercapto benzoyl)-sulfamide

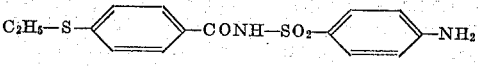

M. P. 185° C. Of course, also other imino alkyl ethers, such as the methyl, propyl, butyl ether, etc. may be used instead of the ethyl ether.

Example 6

1 part of N-(4-aminobenzene sulfone)-3':4'-dimethyl hydrocinnamyl amidine of the formula

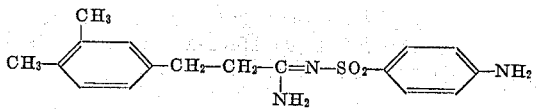

is saponified with 10 parts of 3.5% hydrochloric acid, while stirring for 4 hours at 90°–100° C., and worked up as indicated in Example 2. Thus one obtains the 4-amino-benzene-N₁-(3':4'-dimethyl hydrocinnamoyl)-sulfamide of the melting point of 76°–78° C. and of the formula

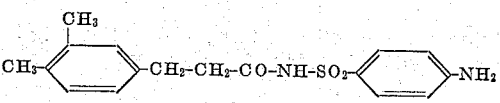

In the same manner (a) N-(4-aminobenzene sulfone)-4'-methyl cinnamyl amidine

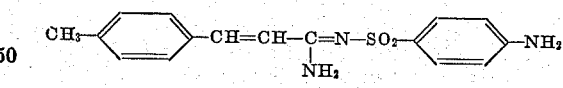

(b) N-(4-aminobenzene sulfone)-4'-methoxy-β-methyl cinnamyl amidine

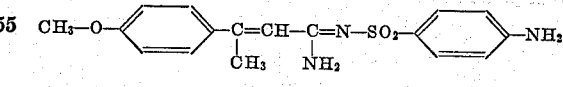

and (c) N-(4-aminobenzene sulfone)-hydrocinnamyl amidine

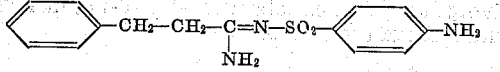

may be hydrolyzed to the corresponding acylated sulfonamides, namely: (a) 4-aminobenzene-N₁-(4'-methylcinnamoyl)-sulfamide

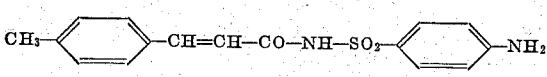

M. P. 209°–210° C. (b) 4-aminobenzene-N₁-(4'-methoxy-β-methylcinnamoyl)-sulfamide

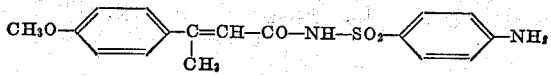

M. P. 182°–184° C. and (c) 4-aminobenzene-N₁-(hydrocinnamoyl)-sulfamide

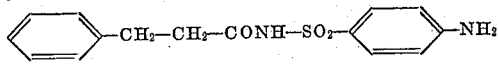

M. P. 160°–161° C.

Example 7

10 parts of N-(4-aminobenzene sulfone)-α-naphthamidine

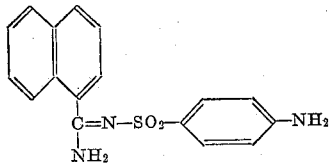

M. P. 182°–184° C. are hydrolysed while stirring for 4 hours at 90°–100° C. by means of 3.5% hydrochloric acid and worked up according to Example 2. There is obtained the 4-aminobenzene-N₁-(α-naphthoyl)-sulfamide of the melting point of 206°–207° C.

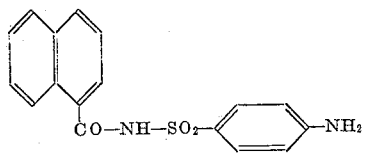

In the same manner the following amidines may be hydrolysed: (a) N-(4-aminobenzene sulfone)-4'-methyl-1'-naphthamidine

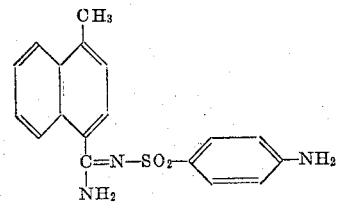

giving the 4-aminobenzene-N₁-(4'-methyl-1'-naphthoyl)-sulfamide of the formula

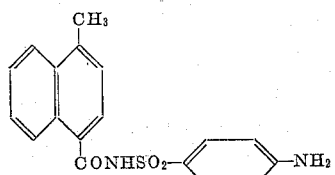

M. P. 222° C. (b) N-(4-aminobenzene sulfone)-β-naphthamidine

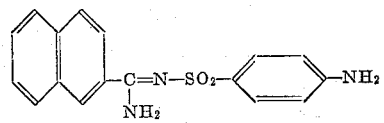

giving the 4-aminobenzene-N₁-(β-naphthoyl)-sulfamide of the formula

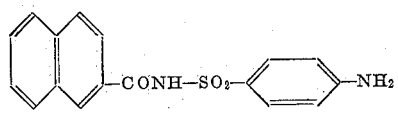

M. P. 205° C. (c) N-(4-aminobenzene sulfone)-1'-methoxy-2'-naphthamidine

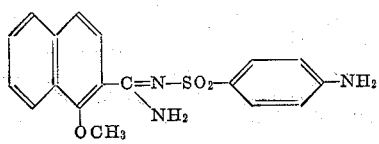

giving the 4-aminobenzene-N₁-(1'-methoxy-2'-naphthoyl)-sulfamide of the formula

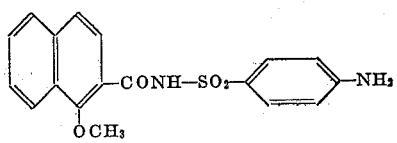

M. P. 230° C. (d) N-(4-aminobenzene sulfone)-1'-methyl-2'-idenylamidine

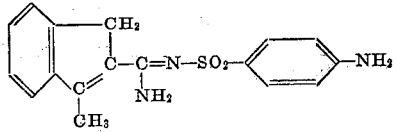

giving the 4-aminobenzene-N₁-(1'-methyl-2'-indenoyl)-sulfamide of the formula

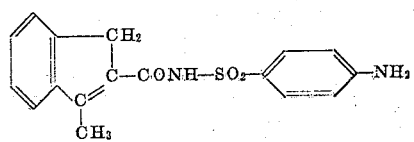

M. P. 233° C. (under decomposition).

Example 8

10 parts of N-(4-aminobenzene sulfone)-α-furylamidine

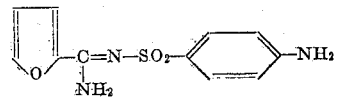

M. P. 165°–166° C. are transformed into the 4-aminobenzene-N₁-(α-furoyl)-sulfamide of the melting point of 188°–189° C. and of the formula

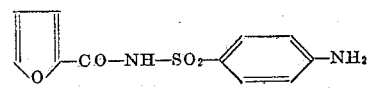

by heating the starting product for 3 hours with 100 parts of 3.5 per cent hydrochloric acid and working up in the usual manner (according to Example 2).

In an analogous manner there is obtained from N-(4-aminobenzene sulfone)-β-pyridylamidine

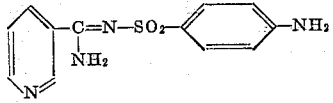

the 4-aminobenzene-N₁-(nicotinoyl)-sulfamide of the formula

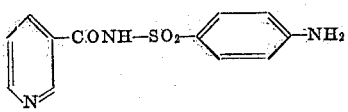

M. P. 256°–257° C.

What we claim is:

1. A process for the manufacture of an N-acyl sulfonamide of the formula

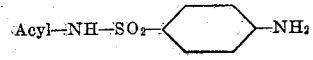

wherein acyl represents a carboxylic acid radical of at least four carbon atoms, which comprises hydrolysing a member selected from the group consisting of an N-sulfanilyl amidine and an N-sulfanilyl iminoether of a carboxylic acid of at least four carbon atoms by heating with an about 0.5–1 N mineral acid.

2. A process for the manufacture of an N-acyl sulfonamide of the formula

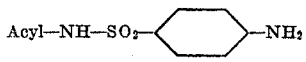

wherein acyl represents a carboxylic acid radical of at least four carbon atoms, which comprises hydrolysing an N-sulfanilyl iminoether of a carboxylic acid of at least four carbon atoms by heating with an about 0.5–1 N mineral acid.

3. A process for the manufacture of an N-acyl sulfonamide of the general formula

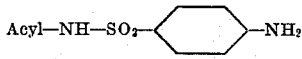

wherein acyl represents a carboxylic acid radical of at least four carbon atoms, which comprises hydrolysing an N-sulfanilyl amidine of a carboxylic acid of at least four carbon atoms by heating with an about 0.5–1 N mineral acid.

4. A process for the manufacture of $N_1$-$\beta,\beta$-dimethyl-acroyl-sulfanilamide which comprises hydrolysing a $\beta,\beta$-dimethylacrylic acid N-sulfanilylamidine by heating with approximately 1 N mineral acid.

5. A process for the manufacture of $N_1$-$\alpha,\beta,\beta$-trimethylacroyl-sulfanilamide which comprises hydrolysing an $\alpha,\beta,\beta$-trimethylacrylic acid N-sulfanilylamidine by heating with approximately 1 N mineral acid.

6. A process for the manufacture of $N_1$-3,4-dimethylbenzoyl-sulfanilamide which comprises hydrolysing a 3,4-dimethylbenzoic acid N-sulfanilylamidine by heating with approximately 1 N mineral acid.

HENRY MARTIN.
FRANZ HÄFLIGER.
OTTO NERACHER.

REFERENCES CITED

The following references are of record in the file of this patent:

Kwartler et al., Jour. Am. Chem. Soc., vol. 65 (Mar. 1943), pp. 354–5.

Northey et al., Jour. Am. Chem Soc., vol. 64 (Dec. 1942), pp. 2763–5.